United States Patent
Sano

[11] Patent Number: 6,104,433
[45] Date of Patent: Aug. 15, 2000

[54] IMAGING APPARATUS

[75] Inventor: Toshiyuki Sano, Yokohama, Japan

[73] Assignee: Matsushita Electric Industrial Co., Ltd., Osaka, Japan

[21] Appl. No.: 09/041,627

[22] Filed: Mar. 13, 1998

[30] Foreign Application Priority Data

Mar. 14, 1997 [JP] Japan ................................ 9-079167

[51] Int. Cl.[7] .................................................. H04N 5/228
[52] U.S. Cl. ......................... 348/363; 348/222; 358/521
[58] Field of Search .................................. 348/207, 222, 348/223, 224, 234, 254, 363, 671, 672, 673, 649, 678, 362; 358/521, 522, 523; H04N 5/228

[56] References Cited

U.S. PATENT DOCUMENTS

| | | | |
|---|---|---|---|
| 4,814,891 | 3/1989 | Uchiyama et al. | 358/296 |
| 4,959,727 | 9/1990 | Imaide et al. | |
| 5,194,960 | 3/1993 | Ota | |
| 5,455,621 | 10/1995 | Morimura | |
| 5,517,333 | 5/1996 | Tamura et al. | |

FOREIGN PATENT DOCUMENTS

| | | |
|---|---|---|
| 0 326 825 | 8/1989 | European Pat. Off. |
| 0 784 399 | 7/1997 | European Pat. Off. |
| 61-57759 | 4/1986 | Japan . |
| 556337 | 3/1993 | Japan . |
| 05103256 | 4/1993 | Japan . |
| 5-56337 | 5/1993 | Japan . |
| 06189182 | 7/1994 | Japan . |
| 06189183 | 8/1994 | Japan . |
| 6253176 | 9/1994 | Japan . |
| 09037145 | 2/1997 | Japan . |
| 09149317 | 6/1997 | Japan . |
| 2277656 | 11/1994 | United Kingdom . |

OTHER PUBLICATIONS

Also Enclosed: Copy of Japanese Office Action in Related Application.

*Primary Examiner*—Tuan Ho
*Attorney, Agent, or Firm*—Lowe Hauptman Gopstein Gilman & Berner

[57] ABSTRACT

An imaging apparatus including an imaging device, an iris control circuit, and a gradation compensation circuit is disclosed with the iris control circuit operated with a priority to the gradation compensation circuit. That is, during generating the gradation control data for gradation compensation circuit, if the iris controlling is required, generating the gradation control data is stopped. Generating the gradation control data is started after completion of the iris controlling.

11 Claims, 4 Drawing Sheets

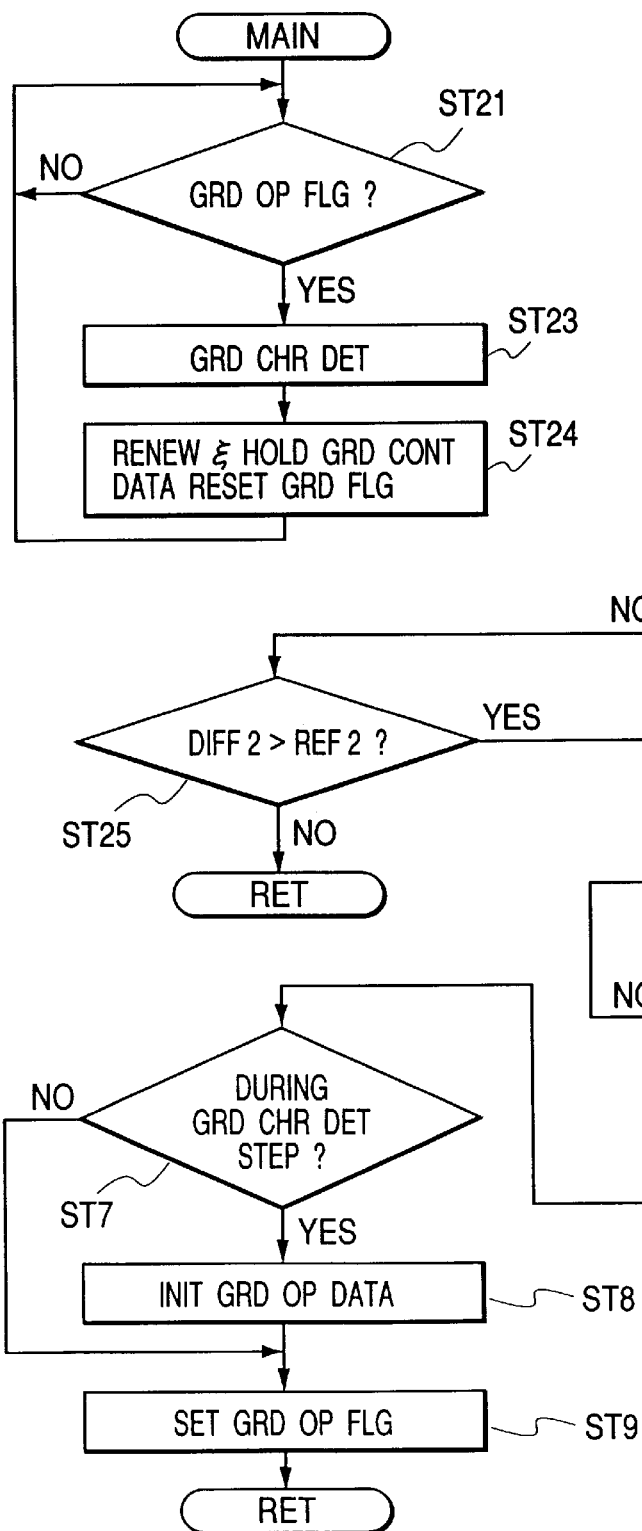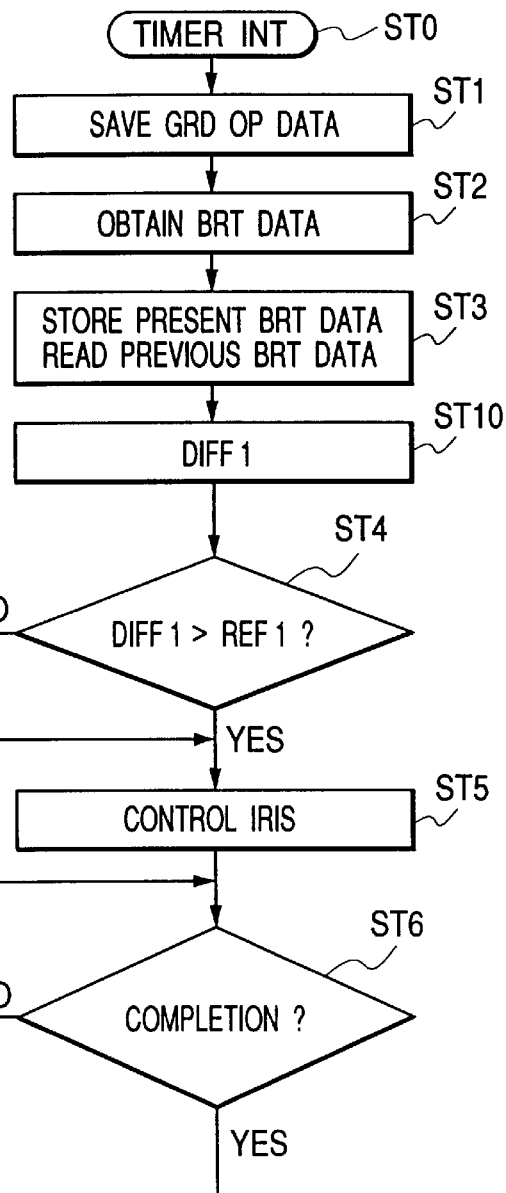
FIG. 4
FIG. 5

IMAGING APPARATUS

BACKGROUND OF THE INVENTION

1. Field of the Invention

This invention relates to an imaging apparatus for receiving an image and generating a video signal.

2. Description of the Prior Art

An imaging apparatus for generating a video signal in response to a received image with automatic exposure controlling is known. Such a first prior art imaging apparatus is disclosed in Japanese patent application provisional publication No. 5-56377. In the first prior art imaging apparatus, automatic exposure controlling is made in accordance with three control parameters such as an iris, a shutter speed, and a gain. A second prior art imaging apparatus discloses a gradation correction circuit for rich gradation expression in Japanese patent application provisional publication No 6-253176.

SUMMARY OF THE INVENTION

The aim of the present invention is to provide a superior imaging apparatus.

According to the present invention, a first imaging apparatus is provided, which comprises: a lens unit having an iris unit; an imaging device, the lens unit forming an image on the imaging device with brightness of the image on the imaging device controlled by the iris unit, the imaging device generating a video signal in response to the image on the imaging device; a brightness data generation portion for repeatedly generating brightness data at a regular interval in accordance with a luminance signal of the video signal; a brightness condition judging portion responsive to the brightness data generation portion for judging a condition of the brightness data; an iris control portion responsive to the brightness condition detection portion for controlling the iris unit in accordance with the brightness data; a gradation characteristic detection portion for detecting a gradation characteristic from the video signal and generating gradation control data in accordance with the detected gradation characteristic; a gradation compensation portion for compensating a gradation of the video signal in accordance with the gradation control data and outputting a gradation compensated video signal; and a control portion responsive to the brightness condition judging portion for operating either of iris control portion or the gradation characteristic detection portion with the iris control portion having a priority to the gradation characteristic detection portion.

The first imaging apparatus may further comprise an observing portion for observing the iris control portion and detecting completion of operation of the iris control portion wherein the control portion operates the gradation characteristic detection portion in response to the completion.

In the first imaging apparatus, the control portion may stop operation of the gradation characteristic detection portion in response to the brightness condition judging portion. In this case, the first imaging apparatus may further comprise a first difference detection portion, having first storing portion, for detecting a first difference between two consecutive the brightness data; a first comparing portion for comparing the first difference with a first reference; a second difference detection portion for detecting a second difference between the brightness data with target data; a second comparing portion for comparing the second difference with a second reference, wherein the control portion stops operation of the gradation characteristic detection portion in response to the brightness condition judging portion when the first difference is higher than the first reference and when the second difference is higher than the second reference.

According to the present invention, a second imaging apparatus is provided, which comprises: a lens unit having an iris unit; an imaging device, the lens unit forming an image on the imaging device with brightness of the image on the imaging device controlled by the iris unit in accordance with iris control data, the imaging device generating a video signal in response to the image on the imaging device; a brightness data generation portion for repeatedly generating brightness data at a regular interval in accordance with a luminance signal of the video signal; a first difference detection portion, having a first storing portion, for detecting a first difference between two consecutive the brightness data; a first comparing portion for comparing the first difference with a first reference; a second difference detection portion for detecting a second difference between the brightness data with target data; a second comparing portion for comparing the second difference with a second reference; an iris control portion, having a second string portion, for generating and holding the iris control data in accordance with the brightness data in response to the first and second comparing portion to reduce the second difference when the first difference is higher than the first reference and when the second difference is higher the second reference; a gradation characteristic detection portion, having a third storing portion, for detecting a gradation characteristic from the video signal and generating and holding gradation control data in accordance with the detected gradation characteristic; a gradation compensation portion for compensating a gradation of the video signal in accordance with the gradation control data and outputting a gradation compensated video signal; an operation detection portion responsive to the first and second comparing portion for detecting whether the iris control portion is operating; and a control portion for controlling the gradation characteristic detection portion to stopping detecting the gradation characteristic in response to the operation detection portion to prevent the gradation characteristic detection portion from renewing the gradation control data.

According to the present invention, a third imaging apparatus is provided, which comprises: a lens unit having an iris unit; an imaging device, the lens unit forming an image on the imaging device with brightness of the image on the imaging device controlled by the iris unit in accordance with iris control data, the imaging device generating a video signal in response to the image on the imaging device; a brightness data generation portion for repeatedly generating brightness data at a regular interval in accordance with a luminance signal of the video signal; a first difference detection portion for detecting a first difference between the brightness data and target data; a first comparing portion for comparing the first difference with a first reference; an iris control portion, having first storing portion, for generating the iris control data in accordance with the brightness data to reduce the first difference and generating a completion signal when the first difference is lower than the first reference in response to the brightness data generation portion; a gradation characteristic detection portion, having second storing portion, for detecting a gradation characteristic from the video signal and generating and holding gradation control data in accordance with the detected gradation characteristic; a gradation compensation portion for compensating a gradation of the video signal in accordance with the gradation control data and outputting a gradation compensated video signal; a second difference detection portion, having a third storing portion, for detecting a second difference between two consecutive the brightness data; a second comparing portion for comparing the second difference with a second reference; and a control portion responsive to the first and second comparing portion for operating the iris control portion when the first difference is higher than the first reference and when the second difference is higher than the second reference, controlling the iris control portion to hold the iris control data in response to the completion signal, and operating the gradation characteristic detection portion in response to the completion signal.

In the third imaging apparatus, the control portion may operate the iris control portion and stop operating the gradation characteristic detection portion to prevent the gradation characteristic detection portion from renewing the gradation control data when the second difference is higher than the second reference.

BRIEF DESCRIPTION OF THE DRAWINGS

The object and features of the present invention will become more readily apparent from the following detailed description taken in conjunction with the accompanying drawings in which:

FIGS. 4 and 5 show flow charts of the second embodiment showing operation of the microprocessor in FIG. 3.

The same or corresponding elements or parts are designated with like references throughout the drawings.

DETAILED DESCRIPTION OF THE INVENTION

Hereinbelow will be described a first embodiment of this invention.

Figure 1:
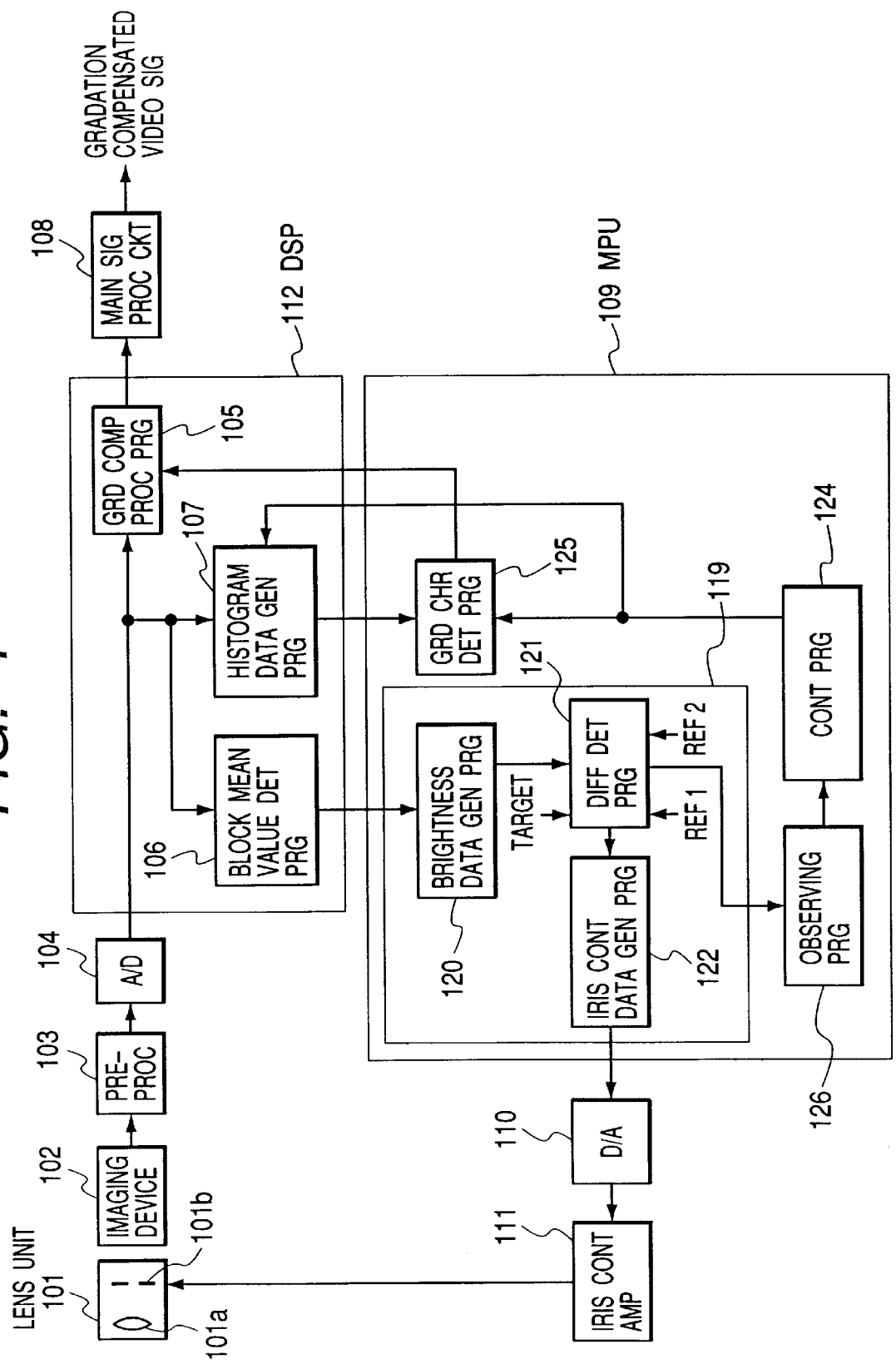
FIG. 1 is a block diagram of an imaging apparatus of a first embodiment.

FIG. 1 is a block diagram of an imaging apparatus of the first embodiment.

The imaging apparatus of the first embodiment comprises a lens unit 101, including a lens assembly 101a and an iris control unit 101b, an imaging device 102 such as a CCD (charge coupled device) image sensor, a pre-processing circuit 103 for processing an output of the imaging device 102, an A/D converter 104 for converting an output of the pre-processing circuit 103 and which outputs video data, a DSP (digital signal processor) 112 responsive to the video data for effecting a dynamic range expanding operation such as gradation compensation, a main signal processing circuit 108 for generating and outputting a video signal from an output of the DSP 112, a microprocessor 109 for generating gradation characteristic data and iris control data in accordance with outputs of the DSP 112, a D/A converter 110 for converting the iris control data into an iris control signal, an iris control control amplifier 111 for driving the iris unit 101b in accordance with the iris control signal.

The DSP includes a gradation control processing program 105 for compensating a gradation of an output of the A/D converter 104 and supplies a gradation compensated signal to the main signal processing circuit 108 and a histogram data generation program 107 for generating histogram data of the output of the A/D converter 104 which is supplied to the microprocessor 109, and a block mean value detection program 106 for detecting mean values of luminance data of the video data from the A/D converter 104 at respective divided screen areas of the video data.

The microprocessor 109 includes a gradation characteristic detection program 125 for detecting gradation characteristic from the histogram data and generating gradation control data supplied to the gradation compensation processing program 105, an iris control program 119, an observing program 126, and a control program 124.

The iris control program 119 includes a brightness data generation program 120 for generating brightness data from the mean values from the block mean value detection program 106 every sampling timing, a difference detection program 121 for detecting a first difference between two consecutive brightness data, that is, the previous brightness data at one-sampling prior timing and the present brightness data and comparing the first difference with a first reference REF1 to detect the change in the brightness of the video data and detecting a second difference between the present brightness data and a target value and comparing the second difference with a second reference, and an iris control data generation program 122 for generating iris control data in accordance with the second difference when the first difference is higher than the first reference REF1 until the second difference is lower than the second reference. That is, the difference detection program 121 judges a condition of the brightness data.

The observing program 126 observes the operation condition of the iris control program 119. The control program 124 controls the gradation characteristic detection program 125 in accordance with the observed operation condition of the iris control program 119.

The D/A converter 110 converts the iris control data into an iris control signal supplied via the iris control amplifier 111 to the iris control unit 101b to control the brightness or exposure of the image focused on the imaging device 102.

The lens assembly 101a focuses an image on the imaging device 102 with the brightness of the focused image on the imaging device 102 controlled by the iris control unit 101b. An output of the imaging device 102 is supplied to the pre-processing circuit 103. The pre-processing circuit 103 effects a CDS (correlation double sampling) for sampling and correcting the sampled signal and effects automatic-gain controlling. The output of the pre-processing circuit 103 is supplied to the A/D converter 104 which supplies the video data to the DSP 112.

The video data is supplied to the block mean value detection program 106. The block mean value detection program 106 divides a screen area of the video data into 48 blocks (horizontal eight blocks and vertical 6 blocks) and detects a mean value of each block.

The brightness data generation program 120 weights mean values from the block mean value detection program 106 with respective coefficients and averages forty-eight weighted mean values and generates the brightness data to the difference detection program 121.

The difference detection program 121 detects the first difference between two consecutive brightness data, that is, the previous brightness data at one-sampling prior timing and the present brightness data and compares the first difference with the first reference REF1 to detect the change in the brightness of the video data.

The difference detection program 121 further detects the second difference between the present brightness data and a target value and compares the second difference with a second reference REF2. When the first difference is higher than the first reference REF1 and when the second difference is higher than the second reference REF2, the difference detection program 121 operates the iris control data generation program 122 and informs the observing program 126 that the iris controlling is being effected.

The iris control data generation program 122 generates the iris control data in accordance with the second difference between the brightness data and the target value to output the iris control data. The D/A converter 110, the iris control amplifier 11, and the iris control unit 101b control exposure in accordance with the iris control data.

When the second difference is lower than the second reference REF2, the difference detection program 121 informs the observing program 126 that the iris controlling has completed.

The histogram data generation program 107 detects a histogram of the luminance data from the A/D converter 104 after completion of the iris controlling. The gradation characteristic detection program 125 detects the gradation characteristic from the detected histogram and generates the gradation control data and supplies and holds the gradation control data to the gradation compensation processing program 105.

The observing program 126 observes the difference detection program 121 and when the difference detection program detects that the first difference is higher than the first reference REF1 and that the second difference is higher than the second reference REF2, the observing program 126 stops operation of the gradation characteristic detection program. In response to this, the gradation characteristic detection program 125 stops detecting the gradation characteristic and holds the gradation control data though the gradation characteristic detection program has been operating.

When the difference detection program 121 detects the completion of the iris controlling, that is, the second difference is lower than the second reference REF2, the observing program 126 receives the information of the completion of the iris controlling. In response to this the control program 124 starts the histogram data generation by the histogram data generation program 107 and the gradation characteristic detection program 125. When the gradation characteristic detection program is stopped during operating, the observing program 126 re-starts the histogram data generation program 107 and the gradation characteristic detection program 125.

The gradation compensation program 105 continuously compensates the gradation of the video data in accordance with the gradation control data from the gradation characteristic detection program 125.

Figure 2:
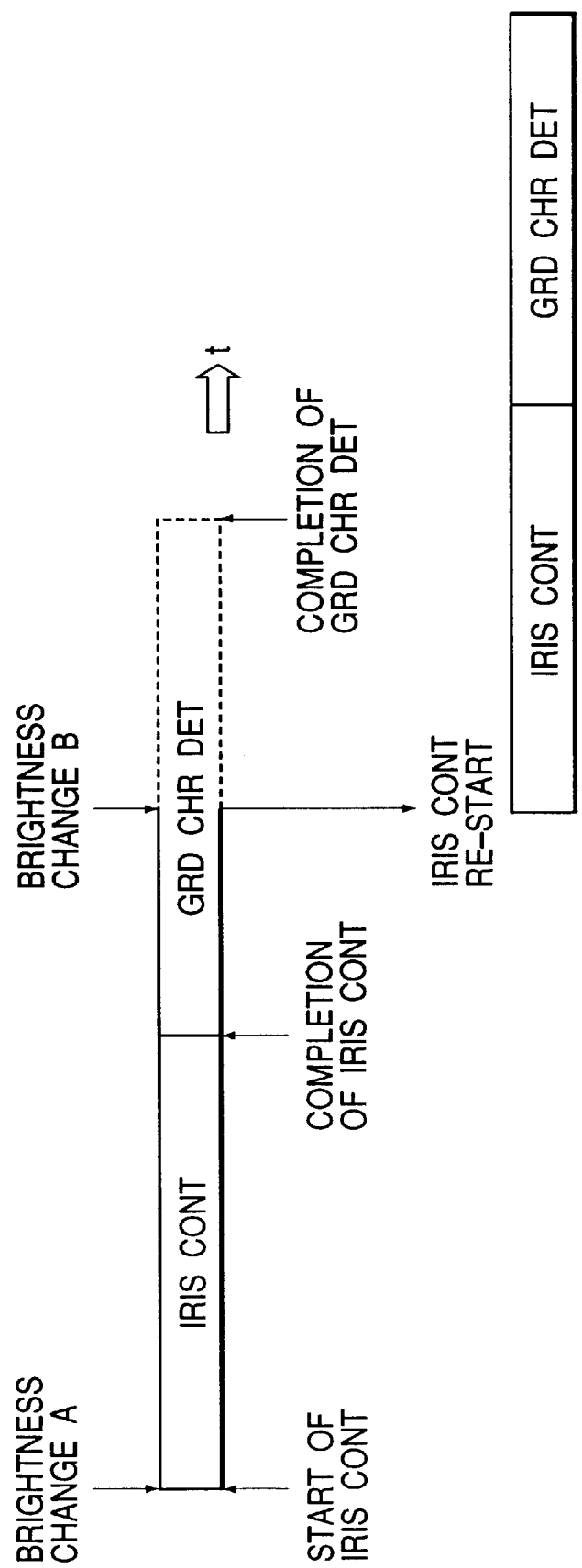
FIG. 2 is a timing chart of the first embodiment showing timings of operation of iris controlling and gradation characteristic detection.

FIG. 2 is a timing chart of the first embodiment showing timings of operation of iris controlling and gradation characteristic detection.

The iris controlling is started in response to a brightness change A which is detected by the difference detection program 121. That is, the difference detection program 121 detects the first difference between two consecutive brightness data. When the first difference is higher than the first reference REF1, the iris controlling is started. When the iris controlling has completed, the gradation characteristic detection is started. When a brightness change B is detected by the difference detection program 121 during the gradation characteristic detection, the observing program 126 and the control program 124 stop the gradation characteristic detection program 125 and re-start the iris controlling.

A second embodiment will be described.

Figure 3:
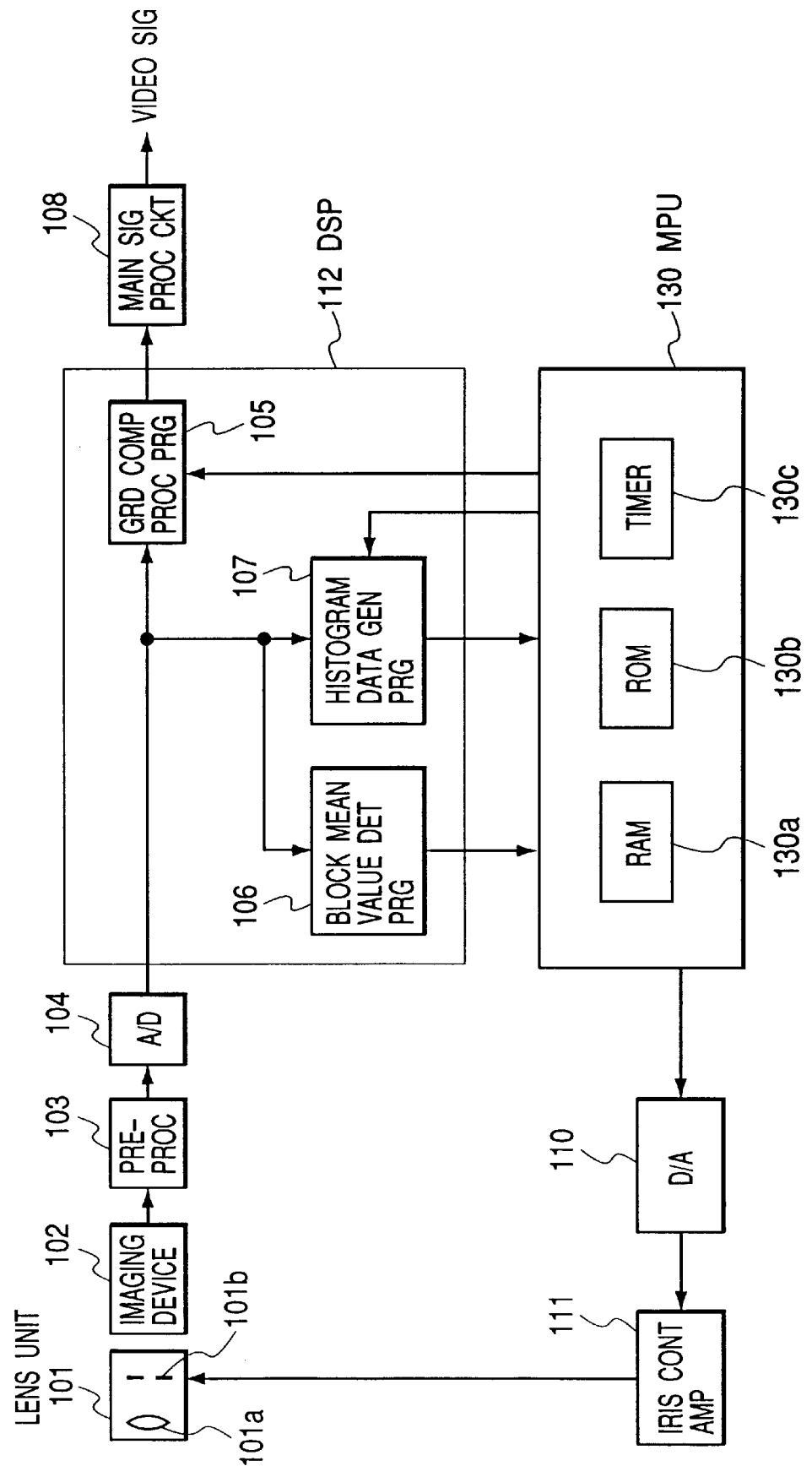
FIG. 3 is a block diagram of an imaging apparatus of a second embodiment.

FIG. 3 is a block diagram of an imaging apparatus of the second embodiment.

The imaging apparatus of the second embodiment comprises a lens unit 101, including a lens assembly 101a and an iris control unit 101b, an imaging device 102 such as a CCD (charge coupled device) image sensor, a pre-processing circuit 103 for processing an output of the imaging device 102, an A/D converter 104 for converting an output of the pre-processing circuit 103 and which outputs a video data, a DSP (digital signal processor) 112 responsive to the video data for effecting a dynamic range expanding operation such as gradation compensation, a main signal processing circuit 108 for generating and outputting a video signal from an output of the DSP 112, a microprocessor 130, having a RAM 103a, a ROM 130b, and a timer 130c, for generating gradation characteristic data and iris control data in accordance with outputs of the DSP 112, a D/A converter 110 for converting the iris control data into an iris control signal, an iris control amplifier 111 for driving the iris unit 101b in accordance with the iris control signal.

The DSP 112 includes a gradation control processing program 105 for compensating a gradation of an output of the A/D converter 104 and which supplies a gradation compensated signal to the main signal processing circuit 108, a histogram data generation program 107 for generating histogram data of the output of the A/D converter 104 which is supplied to the microprocessor 130, and a block mean value detection program 106 for detecting mean values of luminance data of the video data from the A/D converter 104 at respective divided screen areas of the video data.

FIGS. 4 and 5 show flow charts of the second embodiment showing operation of the microprocessor 130 in FIG. 3. FIG. 4 shows a main routine including the gradation characteristic detection step and FIG. 5 shows a timer interruption processing.

The microprocessor 130 repeatedly executes a timer interruption processing in response to interruption requested by a timer 130c provided therein.

In step st1, the microprocessor 130 saves gradation operational data, that is, data used in the gradation characteristic detection operation.

In step st2, the microprocessor 130 obtains the brightness data from the mean values from the block mean value detection program 106. In the following step st3, the microprocessor 130 stores the present brightness data and reads previously stored brightness data. Then, the microprocessor 130 calculates a first difference DIFF1 between the present brightness data and the previously detected and stored data in response to one sampling period prior timing.

The microprocessor 130 compares the first difference DIFF 1 with a first reference REF 1 in step st4. When the first difference DIFF1 is higher than the first reference REF1, processing proceeds to step st5.

In step st4, if the first difference DIFF1 is not higher than the first reference REF1, the microprocessor 130 judges whether a second difference between the present brightness data with a target data is higher than the second reference REF2 in step st25. If the second difference DIFF2 is not higher than the second reference REF2 in step st25, processing returns to the main routine and if the second difference DIFF2 is higher than the second reference REF2 in step st25, processing proceeds to step st5.

In the following step st5 of the step st4 and the step st25, the microprocessor 130 generates the iris control data in step st5. That is, the microprocessor 130 generates the iris control data to reduce a second difference between the present brightness data and the target data.

In the following step st6, the microprocessor 130 detects completion of the iris controlling by comparing the second difference between the present brightness data and the target data with the second reference REF2. If the second difference is lower than the second reference REF2, the completion of the iris controlling is determined and processing proceeds to step st7. If the completion is not detected in the above manner, processing loops step st6 until the completion is so detected.

In st7, the microprocessor 130 detects whether the timer interruption st0 is started during processing of gradation characteristic detection step st13 by checking a return address.

If the timer interruption st0 is started during processing of gradation characteristic detection step st23, the microprocessor 130 initializes the gradation operational data used for gradation characteristic detection and initializes the histogram data in step st8. Then, the microprocessor 130 sets a gradation operation flag in step st9 to re-start the histogram data generation program 107 and the gradation character detection step st23. In step st7, if the timer interruption st0 is started not during processing of gradation characteristic detection step st23, processing directly proceeds from step st7 to step st9 where the gradation operation flag is set. Then, processing returns to the prior processing, for example, the main routine.

In the main routine, the microprocessor 130 checks whether the gradation operation flag is set in step st21. If the gradation operation flag is not set, processing loops step st21 until the gradation operation flag is set.

If the gradation operation flag is set in step st21, the microprocessor 130 detects the gradation characteristic from the histogram data from the histogram data generation program 107 and generates the gradation control data in step st23. In the following step st24, the microprocessor 130 renews the gradation control data in the memory and holds the gradation control data until this step is executed in the future. Then, processing returns to step st21.

As mentioned, the iris controlling is effected when the difference between the previous brightness data and the present brightness data is higher than the first reference and when the difference between the present brightness data and the target data is higher than second reference. In other words, the iris controlling is effected in accordance with the condition of the brightness data. Moreover, the iris controlling is executed though the gradation characteristic detection step st13 is being executed, that is, the gradation characteristic detection step s13 is interrupted to execute the iris controlling. Further, the gradation characteristic detection and generating the gradation control data are effected in response to the completion of the iris controlling. Moreover, processing of the gradation characteristic detection step st13 is stopped and re-started with initializing the histogram and operational data for gradation characteristic detection operation.

As mentioned, the iris controlling is effected with a priority to the gradation compensation. That is, during generating the gradation control data for gradation compensation, if the iris controlling is required, generating the gradation control data is stopped. Generating the gradation control data is started after completion of the iris controlling.

What is claimed is:

1. An imaging apparatus comprising:
   a lens unit having an iris unit;
   an imaging device, said lens unit forming an image on said imaging device with brightness of said image on said imaging device controlled by said iris unit, said imaging device generating a video signal in response to said image on said imaging device;
   brightness data generation means for repeatedly generating brightness data at a regular interval in accordance with a luminance signal of said video signal;
   brightness condition judging means responsive to said brightness data generation means for judging a condition of said brightness data;
   iris control means responsive to said brightness condition judging means for controlling said iris unit in accordance with said brightness data;
   gradation characteristic detection means for detecting a gradation characteristic from said video signal and generating gradation control data in accordance with the detected gradation characteristic;
   gradation compensation means for compensating a gradation of said video signal in accordance with the gradation control data and outputting a gradation compensated video signal; and
   control means responsive to said brightness condition judging means for operating either of iris control means or the gradation characteristic detection means with the iris control means having a priority to the gradation characteristic detection means.

2. The imaging apparatus as claimed in claim 1, further comprising observing means for observing said iris control means and detecting completion of operation of said iris control means wherein said control means operates said gradation characteristic detection means in response to said completion.

3. The imaging apparatus as claimed in claim 1, wherein said control means stops operation of said gradation characteristic detection means in response to said brightness condition judging means.

4. The imaging apparatus as claimed in claim 3, further comprising:
   first difference detection means, having first storing means, for detecting a first difference between two consecutive said brightness data;
   first comparing means for comparing said first difference with a first reference;
   second difference detection means for detecting a second difference between said brightness data with target data; and
   second comparing means for comparing said second difference with a second reference, wherein said control means stops operation of said gradation characteristic detection means in response to said brightness condition judging means when said first difference is higher than said first reference and when said second difference is higher than said second reference.

5. The imaging apparatus as claimed in claim 1, further comprising dynamic range expanding means for effecting a dynamic range expanding operation.

6. The imaging apparatus as claimed in claim 5, wherein said dynamic range expanding means is connected to provide data descriptive of said video signal to said gradation characteristic detection means.

7. The imaging apparatus as claimed in claim 5, wherein said dynamic range expanding means includes said gradation compensation means therein, said dynamic range expanding means thereby effecting said dynamic range expanding operation by providing gradation compensation.

8. A method of controlling an imaging apparatus having a lens unit having an iris unit, an imaging device outputting a video signal in response to an image formed on said imaging device by said lens unit, an iris controller, a gradation characteristic detector which detects a gradation characteristic from said video signal and generates gradation control data in accordance with the detected gradation characteristic, and a gradation compensator which compensates a gradation of said video signal in accordance with the gradation control data and which outputs a gradation compensated video signal, said method comprising the steps of:

using said iris controller to control said iris unit;

using said gradation characteristic detector to detect said gradation characteristic from said video signal; and providing a control priority to said iris controller over said gradation characteristic detector.

9. The method of controlling an imaging apparatus according to claim 8, wherein said step of providing a control priority comprises controlling said gradation characteristic detector to operate in response to completion of an operation of said iris controller.

10. A method of controlling an imaging apparatus having a lens unit including an iris unit, an imaging device outputting a video signal in response to an image formed on said imaging device by said lens unit, a brightness data generator which repeatedly generates brightness data at a regular interval in accordance with a luminance signal of said video signal, an iris controller, a gradation characteristic detector which detects a gradation characteristic from said video signal and generates gradation control data in accordance with the detected gradation characteristic, and a gradation compensator which outputs a gradation compensated video signal in accordance with the gradation control data;

said method comprising the steps of:

detecting a first difference between two consecutive brightness data generated by said brightness data generator;

comparing said first difference with a first reference;

detecting a second difference between the brightness data and target data;

comparing said second difference with a second reference;

controlling said iris controller to start and said gradation characteristic detector to stop when said first difference is higher than said first reference; and controlling said iris controller to stop and said gradation characteristic detector to start when said second difference is lower than said second reference.

11. An imaging apparatus comprising:

a lens unit having an iris unit;

an imaging device outputting a video signal in response to an image formed on said imaging device by said lens unit;

a brightness data generator which repeatedly generates brightness data at a regular interval in accordance with a luminance signal of said video signal;

a first difference detector which detects a first difference between two consecutive brightness data;

a first comparing device which compares said first difference with a first reference;

a second difference detector which detects a second difference between the brightness data and target data;

a second comparing device which compares said second difference with a second reference;

an iris controller which controls said iris unit;

a gradation characteristic detector which detects a gradation characteristic from said video signal and generates gradation control data in accordance with the detected gradation characteristic;

a gradation compensator which compensates gradation of the video signal in accordance with the gradation control data; and a controller which controls either of said iris controller and said gradation characteristic detector so that a greater priority is given to said iris controller than to said gradation characteristic detector.

* * * * *